(12) United States Patent
Sabbah

(10) Patent No.: US 7,542,003 B2
(45) Date of Patent: Jun. 2, 2009

(54) CONTACTLESS LABEL WITH Y-SHAPED OMNIDIRECTIONAL ANTENNA

(75) Inventor: Elias Sabbah, Mougins (FR)

(73) Assignee: Ask S.A., Sophia Antipolis (FR)

( * ) Notice: Subject to any disclaimer, the term of this patent is extended or adjusted under 35 U.S.C. 154(b) by 591 days.

(21) Appl. No.: 11/246,187

(22) Filed: Oct. 11, 2005

(65) Prior Publication Data

US 2008/0204344 A1    Aug. 28, 2008

(30) Foreign Application Priority Data

Oct. 12, 2004   (FR) .................................. 04 10757

(51) Int. Cl.
*H01Q 9/44*      (2006.01)
*H01Q 21/00*     (2006.01)
*G08B 13/14*     (2006.01)

(52) U.S. Cl. ...................... 343/805; 343/810; 340/572.1

(58) Field of Classification Search ................. 343/793, 343/805, 797, 810–820, 846, 823; 340/572.1
See application file for complete search history.

(56) References Cited

U.S. PATENT DOCUMENTS

| | | | |
|---|---|---|---|
| 5,280,286 A | | 1/1994 | Williamson ................... 342/44 |
| 5,523,749 A | * | 6/1996 | Cole et al. ................ 340/10.34 |
| 5,719,586 A | | 2/1998 | Tuttle ......................... 343/726 |
| 6,147,662 A | | 11/2000 | Grabau et al. ............... 343/895 |
| 6,956,472 B1 | * | 10/2005 | Walcott et al. ............... 340/505 |
| 7,119,745 B2 | * | 10/2006 | Gaucher et al. ........ 343/700 MS |
| 7,265,674 B2 | * | 9/2007 | Tuttle ...................... 340/572.1 |

\* cited by examiner

*Primary Examiner*—Shih-Chao Chen
(74) *Attorney, Agent, or Firm*—James C. Lydon

(57) ABSTRACT

Contactless label designed to ensure the traceability of an object featuring a microcircuit (16) and a Y-shaped dipole antenna connected to the microcircuit, which contains information necessary for tracing the object, which can be read with a reader through the exchange of ultra high frequency (UHF) electromagnetic waves. The antenna includes three main wires, a first main wire (10), a second main wire (12) forming a first dipole with the first main wire and a third main wire (14) forming a second dipole with the first main wire. The angle between the first and second main wires is equal to the angle between the first and the third main wires and the angle between the second main wire and the third main wire is between 60° and 180°. Each of the main wires features a secondary wire (24, 26, or 28) at its end perpendicular to the main wire.

12 Claims, 4 Drawing Sheets

CONTACTLESS LABEL WITH Y-SHAPED OMNIDIRECTIONAL ANTENNA

BACKGROUND OF THE INVENTION

1. Field of the Invention

This invention concerns contactless transceiver devices designed to ensure the traceability of objects and particularly concerns a contactless label with an omnidirectional antenna.

2. Description of Related Art

At present, contactless transceiver devices are widely used in numerous applications. One of these applications is the contactless smart card, which is being increasingly used in various sectors, such as the public transport sector, for example. They have also been developed as a means of payment. The exchange of information between a contactless device and the associated reader is accomplished by remote transmission of electromagnetic signals between an antenna housed in the contactless device and a second antenna located in the reader. For developing, storing and processing the information, the device is equipped with a microcircuit connected to the antenna and including a memory zone. During the exchange of information, the contactless device is powered by electromagnetic waves transmitted by the reader.

Another application of contactless devices that is becoming more and more important is their use as labels affixed on objects for identification purpose when performing tracking of goods or inventory position. In these applications, the microcircuit of the label affixed on each object contains in memory the data of the object, which allows the object to be indexed and identified and thereby ensures its traceability.

The label is affixed on the object at the time of its manufacture and remains on it until it is received by the client. The memory of the microcircuit contains information about the characteristics of the object or its contents, if it is a container. This information can be read at all times by a reader. Currently, the frequencies commonly used by the reader for the exchange of data with the label are ultra high frequencies (UHF) of around 900 MHz, which allow the label to be read from a distance of more than 2 meters.

A simple antenna that may be used in contactless labels is the dipole antenna shown in FIG. 1 whose dimension is approximately half a wavelength for the frequency used. The special feature of such a dipole resides in the fact that the energy is radiated mainly in a preferential direction perpendicular to the axis of the dipole as shown in the pattern of FIG. 2. As a result, a simple dipole used as an antenna has the major drawback of emitting directional radiation.

BRIEF SUMMARY OF THE INVENTION

This is why, the purpose of the invention is to provide a contactless label featuring an antenna of the half-wavelength dipole type with omnidirectional radiation.

The purpose of the invention is therefore a contactless label designed to ensure the traceability of an object featuring essentially a microcircuit and a Y-shaped antenna connected to the microcircuit, the memory of the microcircuit containing information necessary for tracing the object, which can be read with a reader through the exchange of ultra high frequency (UHF) electromagnetic waves. The antenna is a dipole type antenna made up of three main wires, a first main wire, a second main wire forming a first dipole with the first main wire and a third main wire forming a second dipole with the first main wire, the main arms being placed in such a way that the angle between the first and second main wires is equal to the angle between the first and the third main wires and the angle between second main wire and the third main wire being between 60° and 180°, and each of the main wires includes at its end a secondary wire perpendicular to the main wire and whose length is between 10 mm and 50 mm.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE PREFERRED EMBODIMENTS

Figure 1:
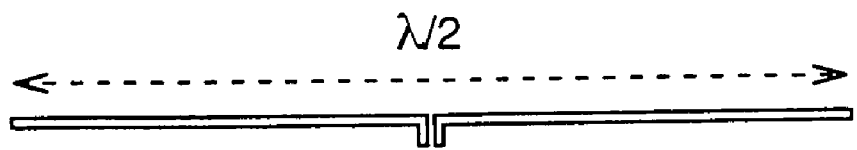
FIG. 1 represents a half-wavelength antenna made up of a dipole.
Figure 2:
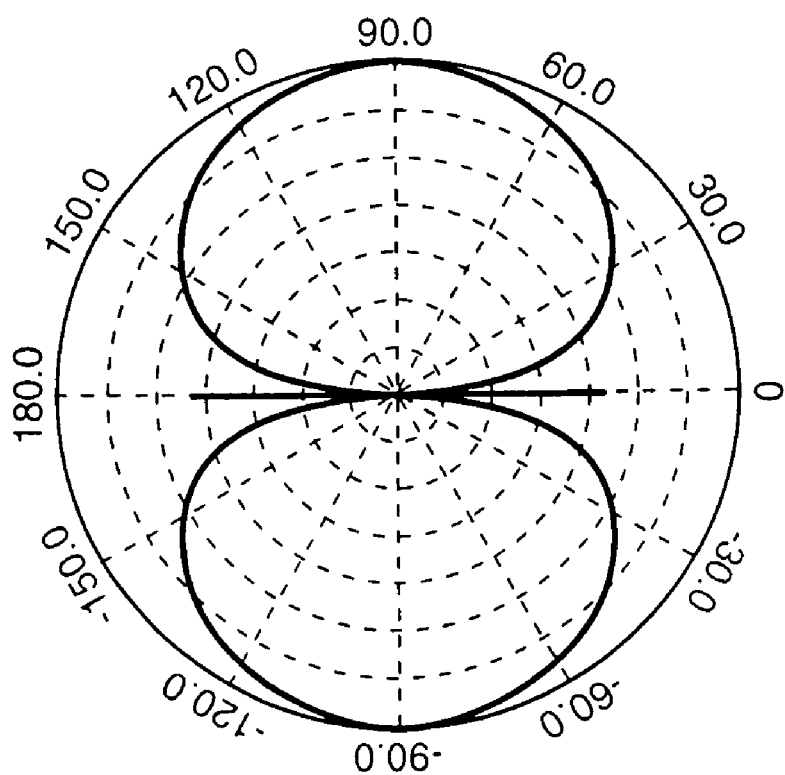
FIG. 2 represents the radiation pattern of the dipole illustrated in FIG. 1.
Figures 3, 3A:
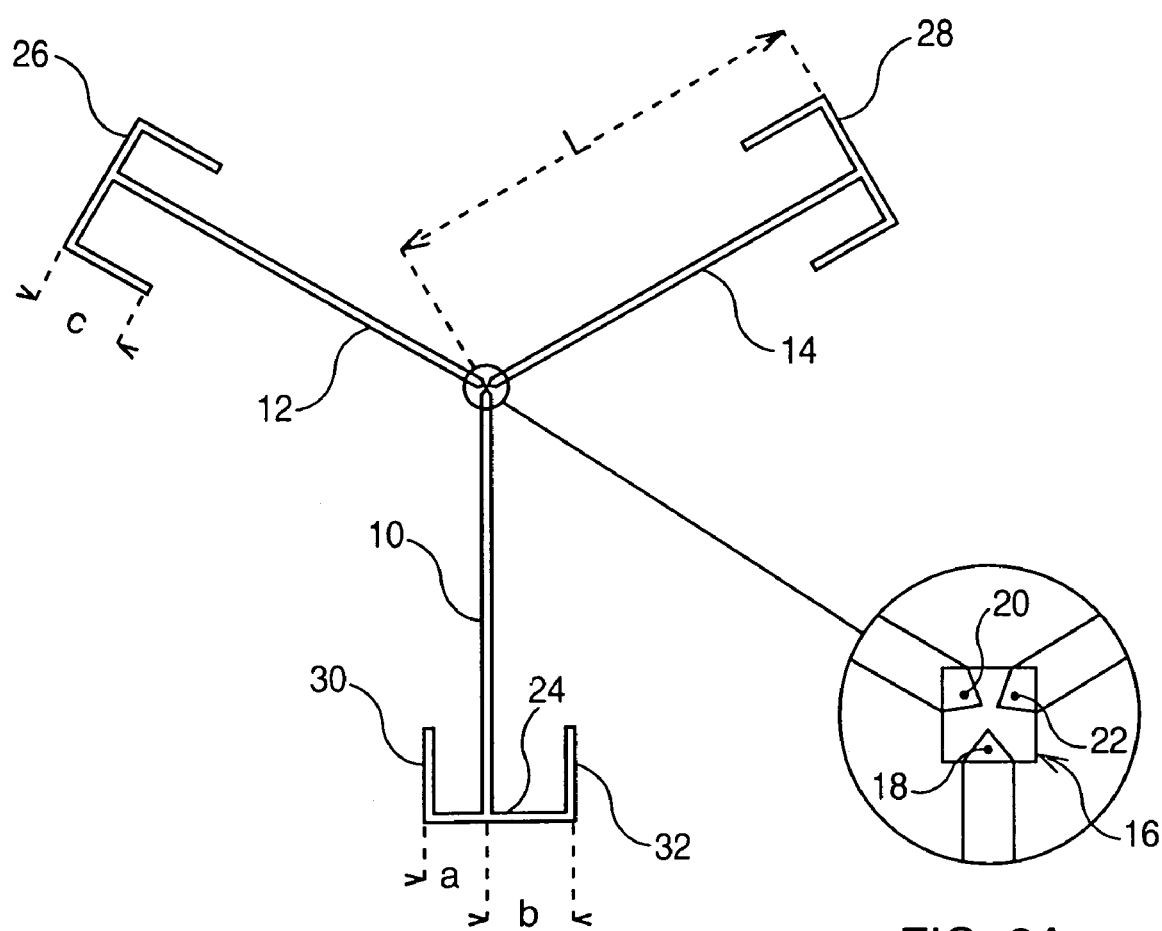
FIG. 3 is the overall diagram of the Y-shaped antenna used in the contactless label according to the invention and FIG. 3A is an enlargement of the connections of the antenna wires to the microcircuit.

The label that makes the subject of the invention includes an antenna represented in FIG. 3 essentially consisting of three main wires 10, 12, and 14 whose length is close to one fourth of the wavelength, that is to say about 80 mm for a frequency of 900 MHz. The second main wire 12 and the third main wire 14 are of identical length L whereas the first main wire 10 can be of a length that is different from other arms but close to L. The first main wire 10 forms a first dipole in combination with the second main wire 12 and the first main wire 10 also forms a second dipole in combination with the third main wire 14.

The angle between the first main wire 10 and the second main wire 12 and the angle between the first main wire 10 and the third main wire 14 are equal. As a result, taken separately, both dipoles by symmetry have the same electrical properties, namely the same radiation pattern and the same input impedance.

The angle formed by the second main wire and the third main wire can vary from a minimum of 60° to 180° corresponding to the alignment between the two wires.

The antenna operates according to a differential mode between the wires on each dipole by means of the load device, which is the microcircuit illustrated enlarged in FIG. 3A. Unlike an ordinary chip which has only two input points connected to the antenna, the microcircuit 16 represented in FIG. 3A is a load having three input points, one point 18 which is used as the reference or GND connected to the first main wire and two identical hot spots 20 and 22 connected to the second and third main wires respectively.

For optimal operation of the antenna illustrated in FIG. 3, the impedance of the antenna must be adapted to the impedance of the microcircuit otherwise the energy received by the antenna is minimal, or even almost zero. If we wish to have a proper adaptation, or an impedance value that is 10% more or less than the rated value, it is very difficult to obtain this value by modifying only the physical characteristics of the main wires. The accepted solution here is to add secondary wires at the end of the main wires and perpendicular to the latter. As such, the first secondary wire 24 is located at the end of the first main wire 10 and is perpendicular to it, the second secondary wire 26 is located at the end of the second main wire 12 and is perpendicular to it, and the third secondary wire 28 is located at the end of the third main wire 14 and is perpendicular to it.

The connection point between a main wire and the associated secondary wire can be variable and thus divide the secondary wire into two segments of length a and b located on either side of the connection. This division is the same for the three secondary wires 24, 26 and 28 when going from one wire to another by rotation. The identical length of the three secondary wires is therefore equal to a+b and is between 10 mm and 50 mm.

To obtain a better adaptation of the Y-shaped antenna, a preferred solution consists in providing a folded wire on each side of each secondary wire so that the folded wires 30 and 32 are at the two ends of the secondary wire 24. The two folded wires associated with each secondary wire have an identical length c between 0 and 40 mm, this length being also the same for the three secondary wires.

It should be noted that the presence of folded wires has the advantage of reducing the overall dimensions of the antenna as they allow the length of the main wires to be reduced. The relation between the length L of the second and third main wires (and approximately that of the first main wire) and the length of the folded wire can be expressed as:

$$60 \text{ mm} < L + c < 100 \text{ mm}$$

Two examples of a Y-shaped antenna compliant with the invention were made. The first example illustrated in FIG. 4 features relatively short folded wires. This antenna additionally features a short-circuit element 34 between the first main wire 10 and the second main wire 12, and a short-circuit element 36 between the first main wire 10 and the third main wire 14. These supplementary elements allow the implementation of the specific ESD (ElectroStatic Discharge) function, which discharges any current generated by electrical pulses of the order of several thousand volts that is likely to damage the microcircuit. By analysing the radiation pattern of the antenna in FIG. 4 illustrated in FIG. 5, those skilled in the art can see that there is no direction without radiation but only a slight attenuation for angular directions between −30° and +60°.

Figure 6:
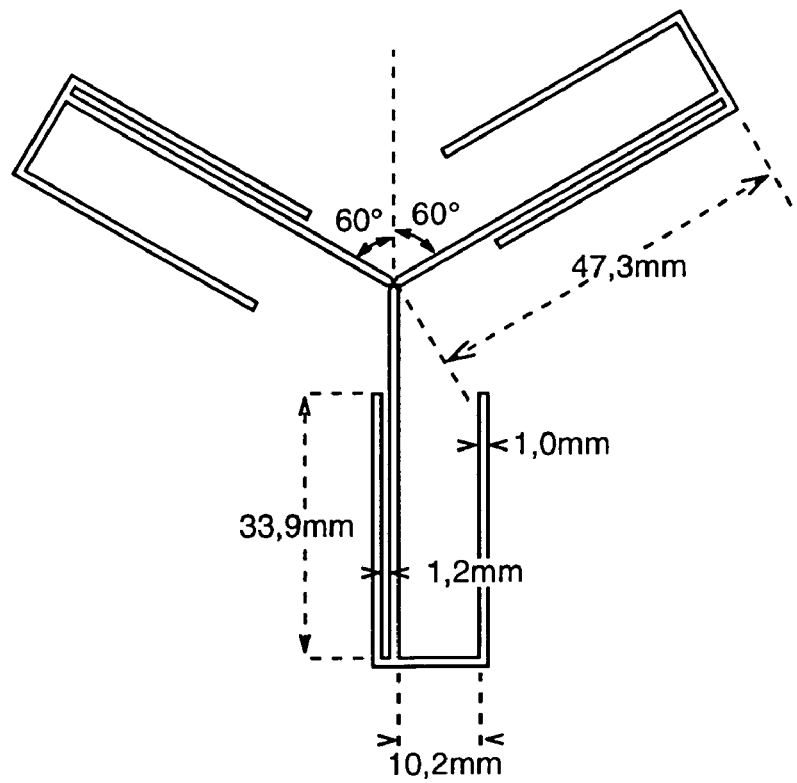
FIG. 6 represents a second example of an embodiment of the Y-shaped antenna.
Figure 7:
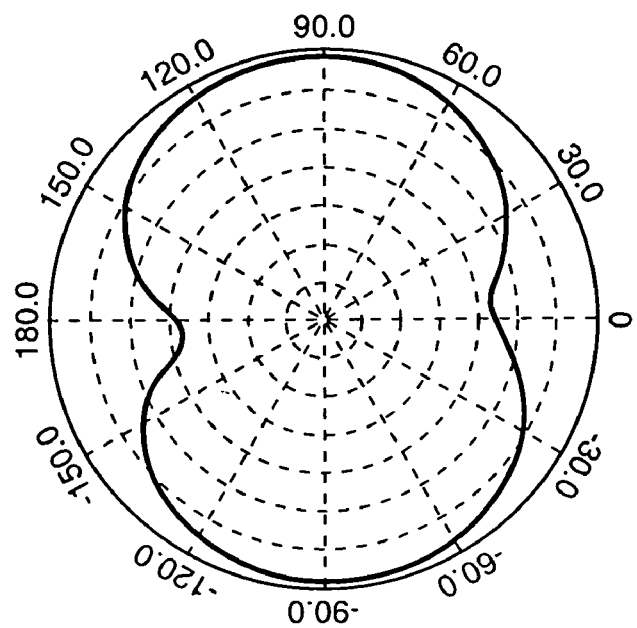
FIG. 7 represents the radiation pattern of the antenna illustrated in FIG. 6.

The second example of the embodiment shown in FIG. 6 does not have short-circuit elements as in the previous example. The main wires are very short while the folded wires are relatively long, which helps produce a contactless surface with a smaller surface area as it is contained in a 85 mm×95 mm rectangle. The radiation pattern illustrated in FIG. 7 does not show any direction without radiation but an attenuation for directions between −60° and +60°.

Figure 4:
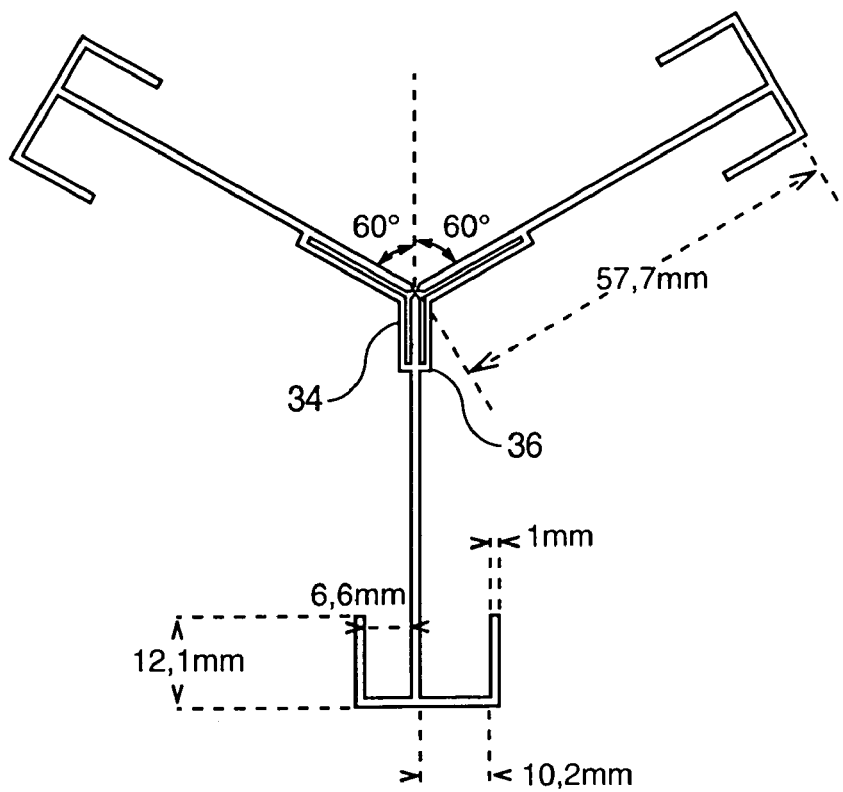
FIG. 4 represents a first example of an embodiment of the Y-shaped antenna.
Figure 5:
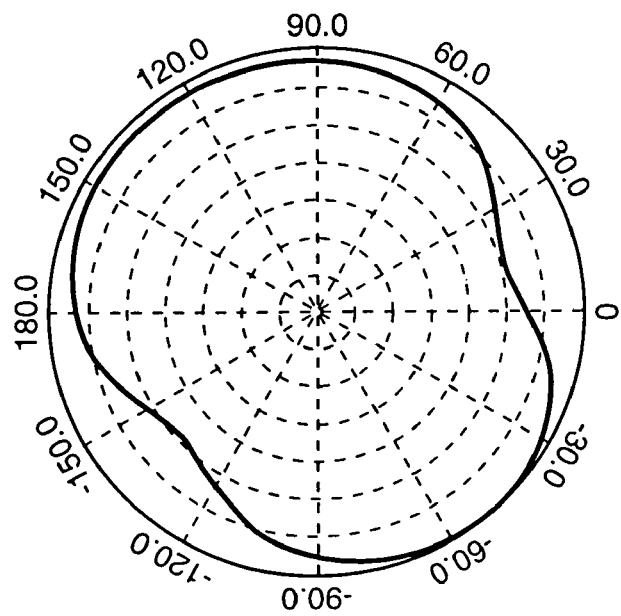
FIG. 5 represents the radiation pattern of the antenna illustrated in FIG. 4.

The Y-shaped antenna that has just been described in reference to FIGS. 4 and 6 preferably has a width of 1 mm and can be fixed by any method but preferably by a screen-printed imprint using ink containing silver particles.

As mentioned above, the label which makes the subject of the invention is used when it is necessary to ensure the traceability of an object, goods or a container. The label operates in the UHF range, that is to say for frequencies that may generally vary between 860 MHz and 960 MHz, and particularly between 902 MHz and 928 MHz.

The invention claimed is:

1. A contactless label designed to ensure the traceability of an object comprising a microcircuit and a Y-shaped antenna connected to said microcircuit, the memory of said microcircuit containing information necessary for tracing said object, said information being read with a reader through the exchange of ultra high frequency (UHF) electromagnetic waves; wherein said antenna is a dipole type antenna made up of three main wires, a first main wire, a second main wire forming a first dipole with said first main wire and a third main wire forming a second dipole with said first main wire, said main wires being placed in such a way that the angle between said first and second main wires is equal to the angle between said first and third main wires and the angle between said second main wire and said third main wire being between 60° and 180°, and each of said main wires including at its end a secondary wire perpendicular to the main wire and whose length is between 10 mm and 50 mm.

2. The contactless label according to claim 1, wherein said second main wire and said third main wire have the same length L.

3. The contactless label according to claim 2, further comprising a connection point located between each of said secondary wires and its associated main wire, the connection point dividing the secondary wire into two segments of length a and b located on either side of said connection point.

4. The contactless label according to claim 3, wherein said segments have a length a and b respectively, the length a+b of said secondary wire being between 10 mm and 50 mm.

5. The contactless label according to claim 1, further comprising a folded wire on each side of each secondary wire of an identical length c between 0 and 40 mm.

6. The contactless label according to claim 5, wherein length c is identical for the three main wires.

7. The contactless label according to claim 6, wherein said length c is such that the sum (L+length c is between 60 mm and 100 mm, wherein L is the length of the second and third main wires.

8. The contactless label according to claim 5, wherein there exists a short-circuit element between said first main wire and said second main wire, and a short-circuit element between said first main wire and said third main wire, said short-circuit elements allowing the implementation of the specific ESD (ElectroStatic Discharge) function to discharge any current generated by electrical pulses of the order of several thousand volts likely to damage said microcircuit.

9. The contactless label according to claim 5, wherein said microcircuit includes three input points, one point used as the reference or GND connected to said first main wire and two identical hot spots and connected to said second and third main wires respectively.

10. The contactless label according to claim 1, wherein there exists a short-circuit element between said first main wire and said second main wire, and a short-circuit element between said first main wire and said third main wire, said short-circuit elements allowing the implementation of the specific ESD (ElectroStatic Discharge) function to discharge any current generated by electrical pulses of the order of several thousand volts likely to damage said microcircuit.

11. The contactless label according to claim 10, wherein said microcircuit includes three input points, one point used as the reference or GND connected to said first main wire and two identical hot spots and connected to said second and third main wires respectively.

12. The contactless label according to claim 1, wherein said microcircuit includes three input points, one point used as the reference or GND connected to said first main wire and two identical hot spots and connected to said second and third main wires respectively.

* * * * *